(12) United States Patent
Chen et al.

(10) Patent No.: US 10,999,768 B2
(45) Date of Patent: May 4, 2021

(54) SESSION CONTEXT HANDLING METHOD, NETWORK ELEMENT, AND TERMINAL DEVICE

(71) Applicant: HUAWEI TECHNOLOGIES CO., LTD., Shenzhen (CN)

(72) Inventors: Zhongping Chen, Shanghai (CN); Yuan Wang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/877,748

(22) Filed: May 19, 2020

(65) Prior Publication Data
US 2020/0280892 A1 Sep. 3, 2020

Related U.S. Application Data

(63) Continuation of application No. PCT/CN2018/116637, filed on Nov. 21, 2018.

(30) Foreign Application Priority Data

Nov. 21, 2017 (CN) .......................... 201711168842.8

(51) Int. Cl.
*H04W 36/00* (2009.01)
*H04W 76/10* (2018.01)
(Continued)

(52) U.S. Cl.
CPC ......... *H04W 36/0033* (2013.01); *H04W 8/08* (2013.01); *H04W 36/14* (2013.01); *H04W 76/10* (2018.02)

(58) Field of Classification Search
CPC ... H04W 36/0033; H04W 76/10; H04W 8/08; H04W 36/14; H04W 36/0066; H04W 36/00
See application file for complete search history.

(56) References Cited

U.S. PATENT DOCUMENTS

2020/0336948 A1* 10/2020 Kawasaki ............... H04M 1/00

FOREIGN PATENT DOCUMENTS

| CN | 101232699 A | 7/2008 |
| CN | 102761853 A | 10/2012 |

(Continued)

OTHER PUBLICATIONS

3GPP TS 23.502, V1.3.0, "3rd Generation Partnership Project;Technical Specification Group Services and System Aspects; Procedures for the 5GSystem; Stage 2 (Release 15)", Nov. 14, 2017, pp. 1-215.

(Continued)

*Primary Examiner* — Marisol Figueroa

(74) *Attorney, Agent, or Firm* — Maier & Maier, PLLC

(57) ABSTRACT

Embodiments relate to the field of wireless communications technologies, and in particular, to a session context handling method, a network element, and a terminal device. A method includes: receiving, by a session management network element, a first message that is from a mobility management network element and that is used to request to establish a session for a terminal device, where the first message carries an identifier of a data network; obtaining, by the session management network element, capability information of the data network based on the identifier of the data network; and when the capability information of the data network is that the data network supports a non-IP session, generating, by the session management network element, a non-IP session context based on an Ethernet or unstructured session context of the terminal device.

20 Claims, 10 Drawing Sheets

(51) Int. Cl.
*H04W 8/08* (2009.01)
*H04W 36/14* (2009.01)

(56) References Cited

FOREIGN PATENT DOCUMENTS

| CN | 102771162 A | 11/2012 |
|---|---|---|
| EP | 2 747 376 A1 | 6/2014 |
| WO | 2019/077011 A1 | 4/2019 |

OTHER PUBLICATIONS

Huawei et al.,"TS 23.501: Update of handling Ethernet and Unstructured PDU session types when moving to EPS", SA WG2 Meeting #124, S2-178844, Nov. 25-Dec. 1, 2017, Reno, USA, pp. 1-6.
Ericsson, "Handling of Ethernet and unstructured PDU session types when Interworking with EPC (23.502)", 3GPP Draft; S2-177739; Oct. 30, 2017, pp. 1-9.
Ericsson, "Handling of Ethernet and unstructured PDU session types when interworking with EPC (23.501)", SA WG2 Meeting #123, S2-17940, Oct. 23-27, 2017, Ljubljana, Slovenia, pp. 1-2.
ZTE et al., "Mapped EPS bearer contexts deletion", 3GPP TSG-CT WG1 Meeting #121bis-e, C1ah-200192, Mar. 5, 2020, 16 pages.
Ericsson et al.,"TS 23.503: clause 6.1.2.1 access and mobility policy control", SA WG2 Meeting #123, S2-177739, Oct. 23-27, 2017, Ljubljana, Slovenia, pp. 1-4.

\* cited by examiner

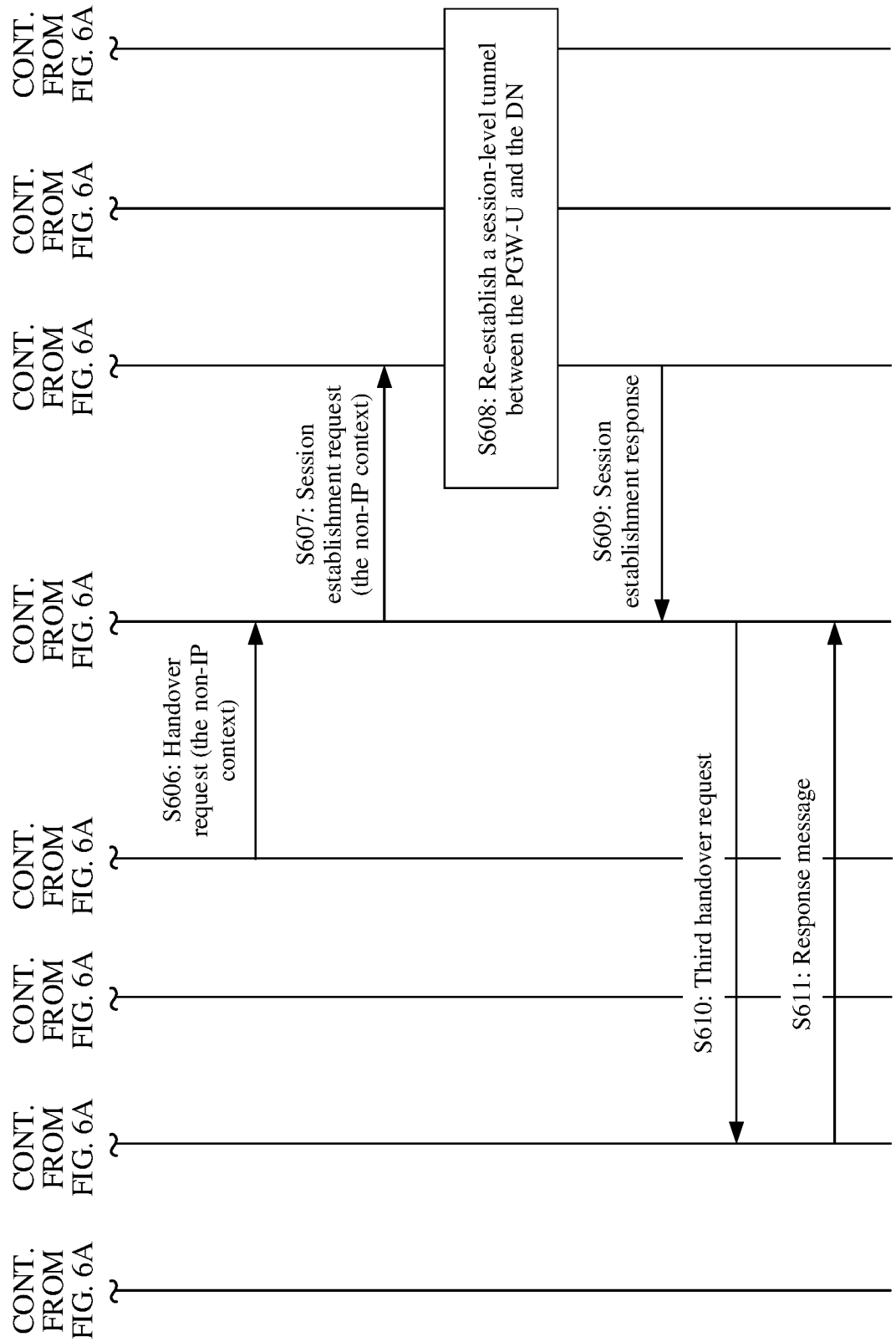

SESSION CONTEXT HANDLING METHOD, NETWORK ELEMENT, AND TERMINAL DEVICE

CROSS-REFERENCE TO RELATED APPLICATIONS

This application is a continuation of International Application No. PCT/CN2018/116637, filed on Nov. 21, 2018, which claims priority to Chinese Patent Application No. 201711168842.8, filed on Nov. 21, 2017, the disclosures of the aforementioned applications are hereby incorporated by reference in their entireties.

TECHNICAL FIELD

Embodiments relate to the field of wireless communications technologies, and in particular, to a session context handling method, a network element, and a terminal device in a wireless communications system.

BACKGROUND

That a 5th generation (5G) network can support four types of packet data unit (PDU) sessions, including an IPv4 type, an IPv6 type, an Ethernet type, and an unstructured type is defined in the 3rd generation partnership project (3GPP) standard. However, a 4th generation (4G) network can support two types of packet data unit sessions, including an IP type and a non-IP type.

The 3GPP standard currently specifies that in a scenario of handover from the 5G network to the 4G network, if a terminal device establishes an Ethernet PDU session in the 5G network, when the terminal device is handed over to the 4G network due to a reason such as movement, the Ethernet session needs to be converted into a non-IP session.

However, in a research process, a person of ordinary skill in the art finds that when an SMF converts an Ethernet session context into a non-IP session context, and delivers the non-IP session context to an MME and an SGW in a 4G system to establish the non-IP session, because the terminal device or a 3GPP external network may not support establishment of the non-IP session, the non-IP session cannot be established. This wastes resources.

SUMMARY

The embodiments describe a session context handling method, a network element, and a terminal device, to resolve a resource waste problem in a session context handling process.

According to a first aspect, an embodiment provides a session context handling method, including: receiving, by a session management network element, a first message that is from a mobility management network element and that is used to request to establish a session for a terminal device, where the first message carries an identifier of a data network; obtaining, by the session management network element, capability information of the data network based on the identifier of the data network; and when the capability information of the data network is that the data network supports a non-IP session, generating, by the session management network element, a non-IP session context based on an Ethernet or unstructured session context of the terminal device; or when the capability information of the data network is that the data network does not support a non-IP session, skipping, by the session management network element, an action of generating a non-IP session context based on an Ethernet or unstructured session context of the terminal device.

The session management network element learns of the capability information of the data network, and determines, based on whether the data network supports the non-IP session, whether to perform the action of generating the non-IP session context based on the Ethernet or unstructured session context, rather than performing, in any case, the action of generating the non-IP session context based on the Ethernet or unstructured session context. Therefore, network resources are saved.

In a possible implementation, the session management network element receives a second message that is from the mobility management network element and that is used to request a session context of the terminal device; and the session management network element sends the non-IP session context to the mobility management network element.

In a possible implementation, the obtaining, by the session management network element, of a capability of the data network based on the mobility management network element includes: obtaining, by the session management network element based on the identifier of the data network, the capability information of the data network from information stored in the session management network element; or sending, by the session management network element, the identifier of the data network to a policy management network element, and receiving the capability information of the data network from the policy control function.

In a possible implementation, the first message further includes a session type.

In a possible implementation, when the session type indicates that the session is of an Ethernet type or an unstructured type, the obtaining, by the session management network element, of capability information of the data network based on the identifier of the data network includes:

obtaining, by the session management network element, the capability of the data network based on the identifier of the data network and the session type.

In a possible implementation, the obtaining, by the session management network element, of the capability of the data network based on the identifier of the data network and the session type includes: obtaining, by the session management network element based on the identifier of the data network and the session type, the capability information of the data network from the information stored in the session management network element; or sending, by the session management network element, the identifier of the data network and the session type to the policy control function, and receiving the capability information of the data network from the policy control function.

According to a second aspect, an embodiment provides a session context handling method, including: obtaining, by a session management network element, capability information of a terminal device; and when the capability information of the terminal device is that the terminal device supports a non-IP session, generating, by the session management network element, a non-IP session context based on an Ethernet or unstructured session context; or when the capability information of the terminal device is that the terminal device does not support a non-IP session, skipping, by the session management network element, an action of generating a non-IP session context based on an Ethernet or unstructured session context of the terminal device.

The session management network element learns of the capability information of the terminal device, and determines, based on whether the terminal device supports the non-IP session, whether to perform the action of generating the non-IP session context based on the Ethernet or unstructured session context, rather than performing, in any case, the action of generating the non-IP session context based on the Ethernet or unstructured session context. Therefore, network resources are saved.

In a possible implementation, the session management network element receives a second message that is from a mobility management network element and that is used to request a session context of the terminal device; and the session management network element sends the non-IP session context to the mobility management network element.

In a possible implementation, the second message carries the capability information of the terminal device, the obtaining, by a session management network element, a capability of a terminal device includes: obtaining, by the session management network element, the capability information of the terminal device from the second message.

In a possible implementation, the obtaining, by a session management network element, of a capability of a terminal device includes: receiving, by the session management network element, a first message that is from the mobility management network element and that is used to request to establish a session for the terminal device, where the first message carries the capability information of the terminal device; and obtaining, by the session management network element, the capability information of the terminal device from the first message; or obtaining, by the session management network element, subscription information of the terminal device from a subscription database, where the subscription information includes the capability information of the terminal device.

According to a third aspect, an embodiment provides a session context handling method, including: obtaining, by a mobility management network element, capability information of a terminal device; receiving, by the mobility management network element, a message that is from an access network device and that is used to request handover; sending, by the mobility management network element, a second message to a session management network element, to request a session context of the terminal device, where the second message carries the capability information of the terminal device; and receiving, by the mobility management network element, a non-IP session context that is returned by the session management network element based on the capability information of the terminal device.

In a possible implementation, the obtaining, by a mobility management network element, of capability information of a terminal device includes:

receiving, by the mobility management network element, a registration request from the terminal device, where the registration request carries the capability information of the terminal device; or obtaining, by the mobility management network element, subscription information of the terminal device from a subscription database, where the subscription information carries the capability information of the terminal device.

According to a fourth aspect, an embodiment provides a session context handling method, including: obtaining, by a terminal device, capability information of the terminal device from information stored in the terminal device; and sending, by the terminal device, a message to a mobility management network element, to request to register with a network or request to establish a session, where the message carries the capability information of the terminal device.

In a possible implementation, when the capability information of the terminal device is that the terminal device supports a non-IP session, the terminal device receives a non-IP session context from a network side, where the non-IP session context is generated based on an Ethernet or unstructured session context of the terminal device.

According to a fifth aspect, an embodiment provides a session management network element. The session management network element has a function of implementing the session management network element in the session context handling method example according to the first aspect or the second aspect. The function may be implemented by hardware, or implemented by hardware executing corresponding software. The hardware or the software includes one or more units or modules corresponding to the foregoing function.

In a possible implementation, a structure of the session management network element may include a transceiver unit and a processing unit. The processing unit is configured to support the session management network element in performing a corresponding function in the communication method according to the first aspect or the second aspect. The transceiver unit is configured to support communication between the session management network element and another device. The session management network element may further include a storage unit. The storage unit is configured to couple to the processing unit, and stores a program instruction and data that are necessary for the session management network element. In an example, the processing unit may be a processor, the transceiver unit may be a communications interface, and the storage unit may be a memory.

According to a sixth aspect, an embodiment provides a mobility management network element. The mobility management network element has a function of implementing the mobility management network element in the session context handling example according to the third aspect. The function may be implemented by hardware, or implemented by hardware executing corresponding software. The hardware or the software includes one or more units or modules corresponding to the foregoing function.

In a possible implementation, a structure of the mobility management network element may include a transceiver unit and a processing unit. The processing unit is configured to support the mobility management network element in performing a corresponding function in the communication method according to the third aspect. The transceiver unit is configured to support communication between the mobility management network element and another device. The mobility management network element may further include a storage unit. The storage unit is configured to couple to the processing unit, and stores a program instruction and data that are necessary for the mobility management network element. In an example, the processing unit may be a processor, the transceiver unit may be a communications interface, and the storage unit may be a memory.

According to a seventh aspect, an embodiment provides a terminal device. The terminal device has a function of implementing the terminal device in the session context handling example according to the fourth aspect. The function may be implemented by hardware, or implemented by hardware executing corresponding software. The hardware or the software includes one or more units or modules corresponding to the foregoing function.

In a possible implementation, a structure of the terminal device may include a transceiver unit and a processing unit. The processing unit is configured to support the terminal device in performing a corresponding function in the communication method according to the fourth aspect. The transceiver unit is configured to support communication between the terminal device and another device. The terminal device may further include a storage unit. The storage unit is configured to couple to the processing unit, and stores a program instruction and data that are necessary for the terminal device. In an example, the processing unit may be a processor, the transceiver unit may be a communications interface, and the storage unit may be a memory.

According to an eighth aspect, an embodiment provides a communications system. The system includes the session management network element and/or the mobility management network element according to any one of the foregoing aspects.

In a possible implementation, the system may further include another device that interacts with the session management network element and/or the mobility management network element in the solutions provided in the embodiments, for example, a PCF or a UDM.

According to a ninth aspect, there is further provided a computer-readable storage medium. The computer-readable storage medium stores an instruction, and when the instruction is run on a computer, the computer is enabled to perform the method according to any one of the foregoing aspects. The computer may be, for example, a session management network element, a mobility management network element, or a terminal device.

According to a tenth aspect, there is provided a computer program product. The computer program product includes a computer software instruction, and the computer software instruction may be loaded by a processor to implement a procedure of the method according to any one of the foregoing aspects.

According to an eleventh aspect, an apparatus is provided. The apparatus includes a processor used by a session management network element, a mobility management network element, or a terminal device to implement a function in the foregoing aspects, for example, generate or process data and/or information in the foregoing methods.

In a possible implementation, the apparatus further includes a memory, and the memory is configured to store a necessary program instruction and necessary data.

In a possible implementation, the apparatus may be a chip system.

In a possible implementation, the chip system may include a chip, or may include a chip and another discrete device.

Compared with the prior art, the embodiments describe the session context handling method, the session management network element, the mobility management network element, and the terminal device, to enable the session management network element to obtain the capability information of the data network and/or the terminal device. If the data network and/or the terminal device supports the non-IP session, the session management network element generates the non-IP session context based on the Ethernet or unstructured session context.

BRIEF DESCRIPTION OF DRAWINGS

The following describes in more details the embodiments with reference to the accompanying drawings.

FIG. 6B is a signaling exchange diagram according to still another embodiment;

DESCRIPTION OF EMBODIMENTS

The following clearly describes the technical solutions in the embodiments with reference to the accompanying drawings in the embodiments.

The term "and/or" describes only an association relationship between associated objects and represents that three relationships may exist. For example, A and/or B may represent the following three cases: only A exists, both A and B exist, and only B exists.

Figure 1:
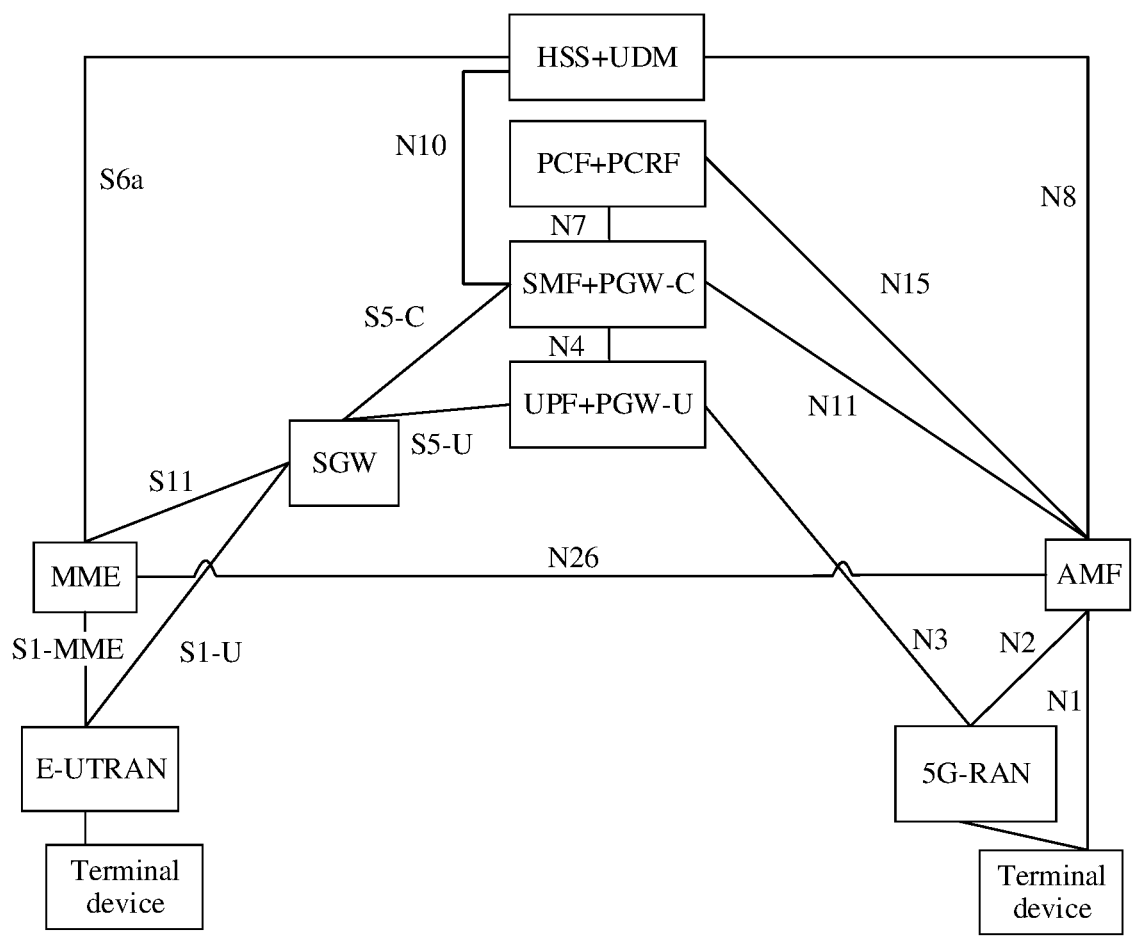
FIG. 1 is a schematic diagram of a possible network architecture.

FIG. 1 is a diagram of a possible network architecture according to an embodiment.

A terminal device may be referred to as user equipment (UE), a mobile station (MS), a mobile terminal device, a terminal device in a 5G network, or the like. The terminal device may communicate with one or more core networks (for example, a network slice) by using a radio access network (RAN), or communicate with another terminal device, for example, perform communication in a device to device (D2D) or machine to machine (M2M) scenario. For example, the terminal device may be a mobile phone (or referred to as a "cellular" phone), a computer with a mobile terminal device, or the like. For example, the terminal device may alternatively be various handheld devices, vehicle-mounted devices, wearable devices, computing devices, or control devices with a wireless communication function, or another processing device connected to a wireless modem. For ease of description, the devices mentioned above are collectively referred to as the terminal device.

A 4G core network EPC includes network devices such as a mobility management network element (MME), a serving gateway (SGW), a packet data network gateway (PGW), and a home subscriber server (HSS). In an architecture of 4G CU separation, the PGW is further separated into a PGW-C and a PGW-U, which respectively represent a control plane of the PGW and a user plane of the PGW. In an architecture of interoperation between a 5G system and a 4G system, the PGW-C is integrated with an SMF, and the PGW-U is integrated with a UPF. The MME is a control node in an LTE access network, and is connected to a 4G RAN by using an S1-MME path. The MME is responsible for performing tracking and paging control on a terminal device in an idle mode. The SGW is responsible for routing and forwarding a data packet of the terminal device, and is also responsible for user plane data exchange performed when the terminal device moves between 4G RANs or between the 4G RAN and another 3GPP technology. The PGW is connected to the SGW by using an S5 path, to implement interface transmission between the terminal device and an external service PDN connection point. One terminal device may simultaneously access a plurality of service PDNs by using a plurality of PGWs. A function of the HSS (not shown in the figure) is a central database, including subscription information related to the terminal device and subscription-related information. The function of the HSS includes mobility management, call and session establishment support, user authentication, and access authorization.

A 5G core network New Core includes network devices such as an access and mobility management function (AMF), a session management function (SMF), a user plane function (UPF), a policy control function (PCF), and a unified data management (UDM) network element. It may be understood that the foregoing functions may be hardware devices, software functions running on dedicated hardware, or virtualized functions instantiated on a platform (for example, a cloud platform). The AMF is responsible for a registration procedure performed when the terminal device accesses the 5G core network, and location management in a movement process of the terminal device. The SMF is responsible for establishing a corresponding session connection on a network side when the terminal device initiates a service, and providing a specific service to the terminal device, such as delivering a data packet forwarding policy, a quality of service (QoS) policy, and the like to the UPF based on an N4 interface between the SMF and the UPF. The UPF is mainly responsible for forwarding a data packet, controlling QoS, collecting statistics about charging information, and the like. The PCF is a policy control function in the network, and stores a local policy or a roaming policy of the network. The UDM is a database, and stores subscription information related to the terminal device.

When handover occurs, the access and mobility management function AMF in the 5G network receives a handover request from a 5G access network (RAN). The AMF selects an MME and sends a request message to the 5G session management function SMF, to request a session management context. If the SMF stores an Ethernet PDU session context of the terminal device, the SMF converts the Ethernet PDU session context into a non-IP context, and returns the non-IP context to the AMF by using a response message. The AMF sends another handover request to the MME in the 4G system, where the handover request includes the non-IP context of the terminal device. The MME sends a session establishment request to the SGW in the 4G system, where the session establishment request includes the non-IP context of the terminal device. The SGW establishes a non-IP PDU session based on the context. The MME sends a third handover request to a 4G RAN node. The 4G RAN node returns a response message to the MME.

In a research process, a person of ordinary skill in the art finds that in the foregoing process, although the SMF converts the Ethernet PDU session context into the non-IP session context and delivers the non-IP session context to the MME and the SGW in the 4G system to establish the non-IP session, because actually, the terminal device or a 3GPP external network may not support establishment of the non-IP session, the non-IP session cannot be established. This wastes resources.

FIG. 1 shows a possible system architecture (interoperation between the 5G system and the 4G system). It may be understood that the embodiments may be applied to a scenario of handover from any first network that supports an Ethernet session and an unstructured session to any second network that supports a non-IP session (for example, interoperation between a future 6G system and the 4G system). A network element in the first network (for example, the 5G network) includes: an access network element (for example, the 5G RAN), configured to provide a radio channel and an access core network to the terminal device; a mobility management network element (for example, the AMF), configured to provide access and mobility management to the terminal device; a session management network element (for example, the SMF), configured to provide session management to the terminal device, including session context generation and modification, user plane tunnel establishment, and the like; a policy management network element (for example, the PCF), configured to provide a network policy; and a subscription database (for example, the UDM), configured to store subscription data of the terminal device.

Figure 2:
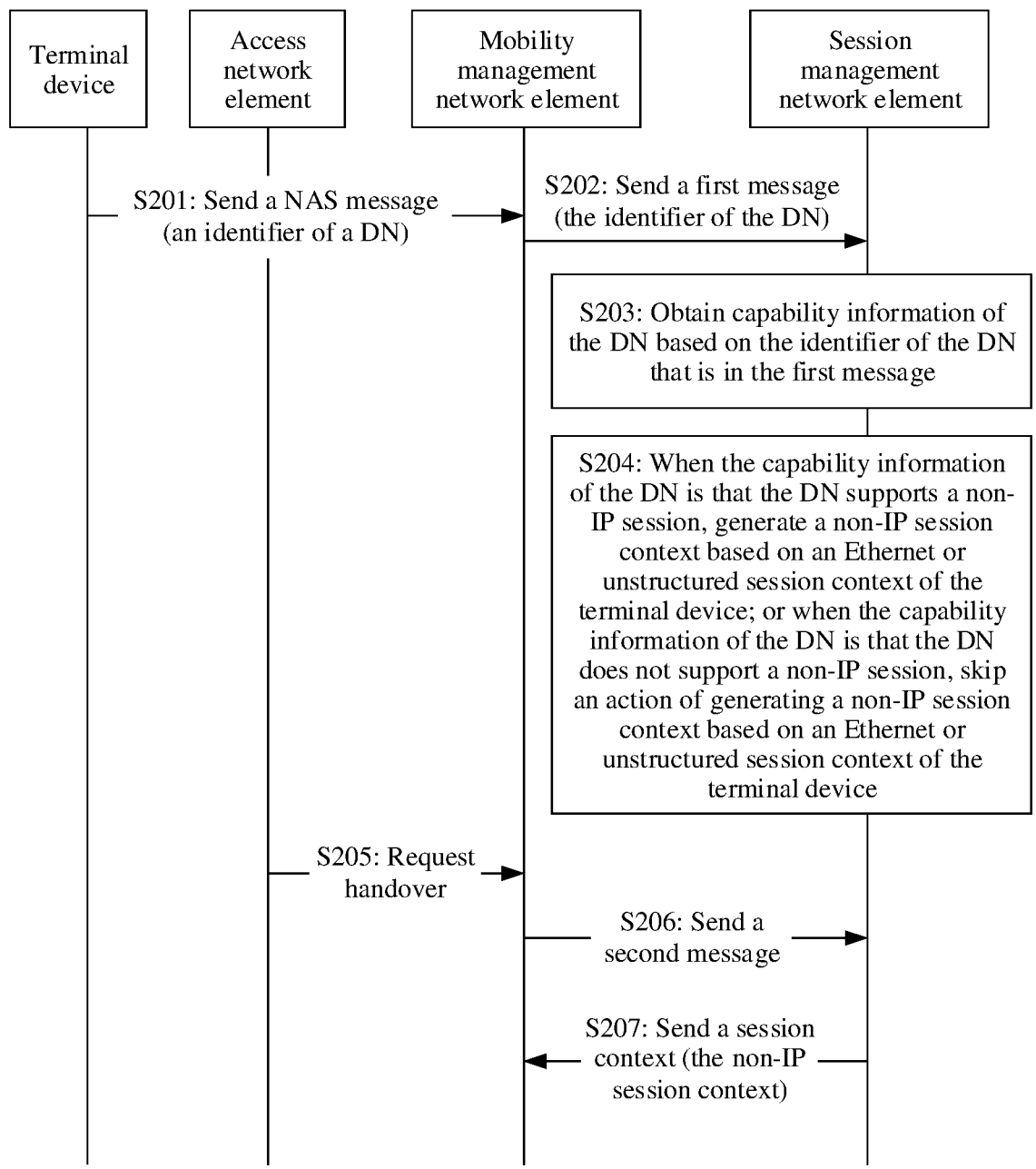
FIG. 2 is a schematic flowchart of a communication method according to an embodiment.

Based on the foregoing system architecture, FIG. 2 is a schematic flowchart of a communication method according to an embodiment. In this embodiment, a session management network element obtains capability information of a data network (DN). If the data network supports a non-IP session, the session management network element generates a non-IP session context based on an Ethernet or unstructured session context. Optionally, when handover occurs, the session management network element may further send the non-IP session context to a mobility management network element. The following provides a detailed description with reference to the accompanying drawings.

Step S201: A terminal device sends a NAS message to the mobility management network element, to request to establish a session for the terminal device, where the NAS message carries an identifier of the DN.

The NAS message is used to request to establish the session for the terminal device. This is equivalent to that the terminal device requests to access the DN corresponding to the identifier of the DN. The NAS message includes two parts: a message (1) sent by the terminal device to the mobility management network element; and a message (2) sent by the terminal device to the session management network element. The mobility management network element transparently forwards, to the session management network element, the message (2) sent by the terminal device to the session management network element. The identifier of the data network may be included in the message (1) sent by the terminal device to the mobility management network element, or included in the message (2) sent by the terminal device to the session management network element, or included in both the two parts. For example, the message (2) sent by the terminal device to the session management network element may be a session establishment request. For example, the NAS message may be a PDU session establishment request message.

The identifier of the DN is information used to identify the data network. For example, the identifier may be an access point name (APN), or may be a data network name (DNN).

Optionally, the NAS message further includes a session type. The session type is used to indicate a type of the session, for example, and may be an IP type, an Ethernet type, or an unstructured type. A representation form of the session type may be a PDU type information element. The session type included in the NAS message indicates that the type of the session requested to be established is the Ethernet type or the unstructured type.

Step S202: The mobility management network element sends a first message to the session management network element based on the NAS message, to request to establish the session for the terminal device, where the first message carries the identifier of the DN.

For example, the first message may be a session context establishment request, and the first message includes the message (2) sent by the terminal device to the session management network element in step S201, for example, includes the session establishment request.

Optionally, the first message further includes the session type.

Step S203: The session management network element obtains the capability information of the DN based on the identifier of the DN in the first message.

The capability information of the DN indicates whether the data network supports the non-IP session, and a representation form may be a DN capability. It can be understood that the capability information of the DN may alternatively be represented in another manner, for example, capability information (N6 capability) of an interface between a user plane function (UPF) and an application server, or capability information of an application server. All the foregoing representation manners can indicate whether the network supports the non-IP session.

That the session management network element obtains the capability information of the DN based on the identifier of the DN includes: the session management network element obtains, based on the identifier of the DN, the capability information of the DN from information stored in the session management network element; or sends the identifier of the DN to a policy management network element, and receives the capability information of the DN from the policy management network element.

Optionally, when the first message includes the session type, and the session type indicates that the session requested to be established is of the Ethernet type or the unstructured type, that the session management network element obtains the capability information of the DN based on the identifier of the DN includes: the session management network element may obtain the capability information of the DN based on the identifier of the DN and the session type. For example, any one of the following manners may be used.

Manner a: The session management network element obtains, based on the identifier of the DN and the session type, the capability information of the DN from the information stored in the session management network element. For example, the session management network element learns that the session type is the Ethernet type or the unstructured type, and the session management network element obtains, based on the identifier of the DN, the capability information of the DN from the information stored in the session management network element.

Manner b: The session management network element sends the identifier of the DN and the session type to a policy control function, and receives the capability information of the DN from the policy control function. The policy control function receives the identifier of the DN and the session type, and learns that the session type is the Ethernet type or the unstructured type. In this case, the policy control function learns that the capability information of the DN needs to be returned, and the policy control function obtains the capability information of the DN based on the identifier of the DN and returns the capability information to the session management network element.

Step S204: When the capability information of the DN is that the DN supports the non-IP session, the session management network element generates the non-IP session context based on the Ethernet or unstructured session context of the terminal device. Alternatively, when the capability information of the DN is that the DN does not support the non-IP session, the session management network element skips an action of generating the non-IP session context based on the Ethernet or unstructured session context of the terminal device. Alternatively, there may be another case. Details are not described herein.

Step S205: The mobility management network element receives a message that is from an access network element and that is used to request handover. The mobility management network element learns that the terminal device needs to be handed over to a 4G network.

Step S206: The mobility management network element sends a second message to the session management network element to request a session context of the terminal device.

For example, the second message may be a session context request message.

It may be understood that there is no sequence between step S204, step S205, and step S206. In other words, step S204 may be performed before or after step S205 and step S206, or step S204, step S205, and step S206 may be performed at the same time.

Step S207: The session management network element sends the session context of the terminal device to the mobility management network element. If the non-IP session context is generated in step S204, the session context of the terminal device includes the non-IP session context. If no non-IP session context is generated in step S204, the session context of the terminal device does not include the non-IP session context.

In this embodiment, the session management network element learns of the capability information of the DN, and determines, based on whether the DN supports the non-IP session, whether to perform the action of generating the non-IP session context based on the Ethernet or unstructured session context, rather than performing, in any case, the action of generating the non-IP session context based on the Ethernet or unstructured session context. Therefore, network resources are saved.

Figure 3:
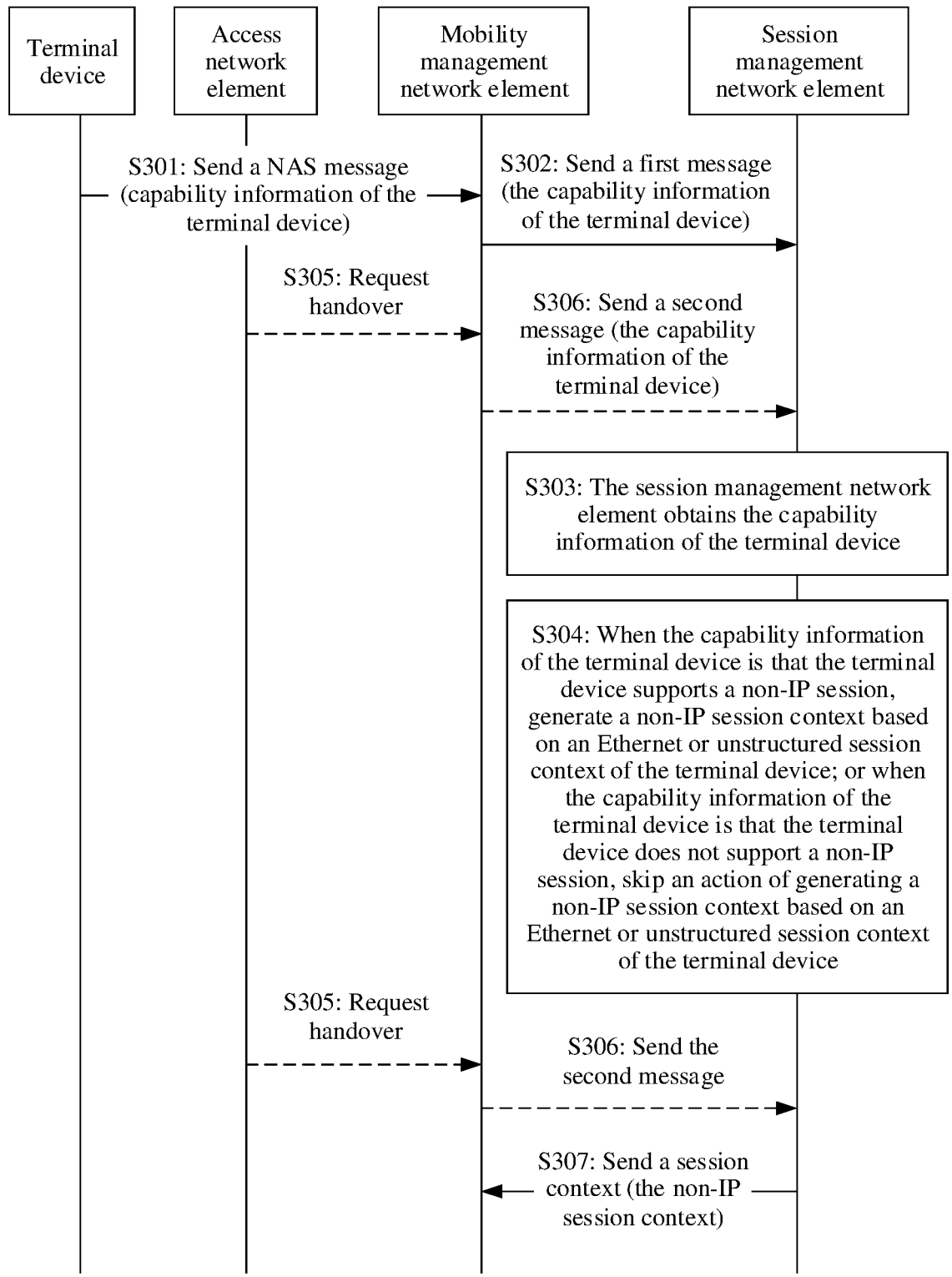
FIG. 3 is a schematic flowchart of a communication method according to an embodiment.

Based on the foregoing network structure, FIG. 3 is a schematic flowchart of a session context handling method according to another embodiment. In this embodiment, a session management network element obtains capability information of a terminal device. If the terminal device supports a non-IP session, the session management network element generates a non-IP session context based on an Ethernet or unstructured session context. Optionally, when handover occurs, the session management network element may further send the non-IP session context to a mobility management network element. The following provides a detailed description with reference to the accompanying drawings.

Step S301: The terminal device sends a NAS message to the mobility management network element, to request to establish a session for the terminal device.

Optionally, the NAS message carries the capability information of the terminal device. The capability information of the terminal device indicates whether the terminal device supports the non-IP session. For example, a representation method of the capability information may be a UE capability information element. It can be understood that the capability information of the terminal device may alternatively be represented in another manner. The capability information of the terminal device is obtained by the terminal device from information stored in the terminal device, and the capability information in the information stored in the terminal device may be delivered by a network side to the terminal device in advance, or may be preconfigured on the terminal device.

For example, the NAS message is used to request to establish the session for the terminal device. This is equivalent to that the terminal device requests to access a DN network corresponding to an identifier of the DN. The NAS message includes two parts: a message (1) sent by the terminal device to the mobility management network element; and a message (2) sent by the terminal device to the session management network element. The mobility management network element transparently forwards, to the session management network element, the message (2) sent by the terminal device to the session management network element. The capability information of the terminal device may be included in the message (1) sent by the terminal device to the mobility management network element, or included in the message (2) sent by the terminal device to the session management network element, or included in both the two parts. For example, the message (2) sent by the terminal device to the session management network element may be a session establishment request. For example, the NAS message may be a PDU session establishment request message.

Optionally, the NAS message further includes a session type. For a description, refer to step S201.

Step S302: The mobility management network element sends a first message to the session management network element, to request to establish the session for the terminal device.

The first message may be a session context establishment request, and the first message includes the message (2) sent by the terminal device to the session management network element in step 301, for example, includes the session establishment request.

Optionally, the first message includes the capability information of the terminal device. The capability information of the terminal device in the first message may be from the NAS message in step S301. For example, the capability information of the terminal may be included in the message (2) sent by the terminal device to the session management network element, namely, the session establishment request. Alternatively, the capability information of the terminal may be obtained by the mobility management network element, in a process in which the terminal device registers with the network, from a registration request of the terminal device, or from a subscription database based on an identifier of the terminal device.

Optionally, the first message further includes the session type.

Step S303: The session management network element obtains the capability information of the terminal device.

A process in which the session management network element obtains capability information of the terminal device may be performed in any one of the following manners.

Manner 1: S303*a*: When the first message carries the capability information of the terminal device, the session management network element obtains the capability information of the terminal device from the first message, and then steps S304 to S306 are performed.

Manner 2: S303*b*: The session management network element obtains subscription information of the terminal device from a UDM, where the subscription information includes the capability information of the terminal device, and then steps S304 to S306 are performed. A process may be as follows: the first message sent by the mobility management network element to the session management network element includes the identifier of the terminal device. The session management network element queries the subscription database based on the identifier of the terminal device, and obtains capability information of the terminal device from subscription data of the terminal device.

Step S304: When the capability information of the terminal device is that the terminal device supports the non-IP session, the session management network element generates the non-IP session context based on the Ethernet or unstructured session context. Alternatively, when the capability information of the terminal device is that the terminal device does not support the non-IP session, the session management network element skips an action of generating the non-IP session context based on the Ethernet or unstructured session context of the terminal device. Alternatively, there may be another case. Details are not described herein.

Step S305: The mobility management network element receives a request message from an access network element, and learns that the terminal device needs to be handed over to a 4G network.

Step S306: The mobility management network element sends a second message to the session management network element, to request a session context of the terminal device.

For example, the second message may be a session context request message.

It may be understood that there is no sequence between step S304, step S305, and step S306. In other words, step S304 may be performed before or after step S305 and step S306, or step 304, step S305, and step S306 may be performed at the same time.

Step S307: The session management network element sends the session context of the terminal device to the mobility management network element. If the non-IP session context is generated in step S304, the session context of the terminal device includes the non-IP session context. If no non-IP session context is generated in step S304, the session context of the terminal device does not include the non-IP session context.

Manner 3: S306 is performed before step S303. For example, the session management network element first receives the second message that is from the mobility management network element and that is used to request the session context of the terminal device, where the second message carries the capability information of the terminal device. Then, step S303 is performed. For example, Step S303 may be step S303*c*: the session management network element obtains the capability information of the terminal device from the second message. Then, step S304 and step S307 are performed. The capability information of the terminal device that is carried in the second message may be obtained by the mobility management network element, in a process in which the terminal device registers with the network, from a registration request of the terminal device or from a subscription database based on an identifier of the terminal device.

In this embodiment, the session management network element learns of the capability information of the terminal device, and determines, based on whether the terminal device supports the non-IP session, whether to perform the action of generating the non-IP session context based on the Ethernet or unstructured session context, rather than performing, in any case, the action of generating the non-IP session context based on the Ethernet or unstructured session context. Therefore, network resources are saved.

In another embodiment, the embodiments in FIG. 2 and FIG. 3 may be combined. The session management network element obtains the capability information of the DN and the capability information of the terminal device, and determines, based on the capability information of the DN and the capability information of the terminal device, whether to perform the action of generating the non-IP session context based on the Ethernet or unstructured session context. When the capability information of the DN is that the DN supports the non-IP session, and the capability information of the terminal device is that the terminal device supports the non-IP session, the session management network element generates the non-IP session context based on the Ethernet or unstructured session context. For a process of obtaining the capability information of the DN, refer to step S203 in FIG. 2. For a process of obtaining the capability information of the terminal device, refer to step S303 in FIG. 3. Optionally, when the handover occurs, the session management network element may further send the non-IP session context to the mobility management network element. For details, refer to steps S205 to S207 in FIG. 2 or steps S305 to S307 in FIG. 3.

Figure 4A:
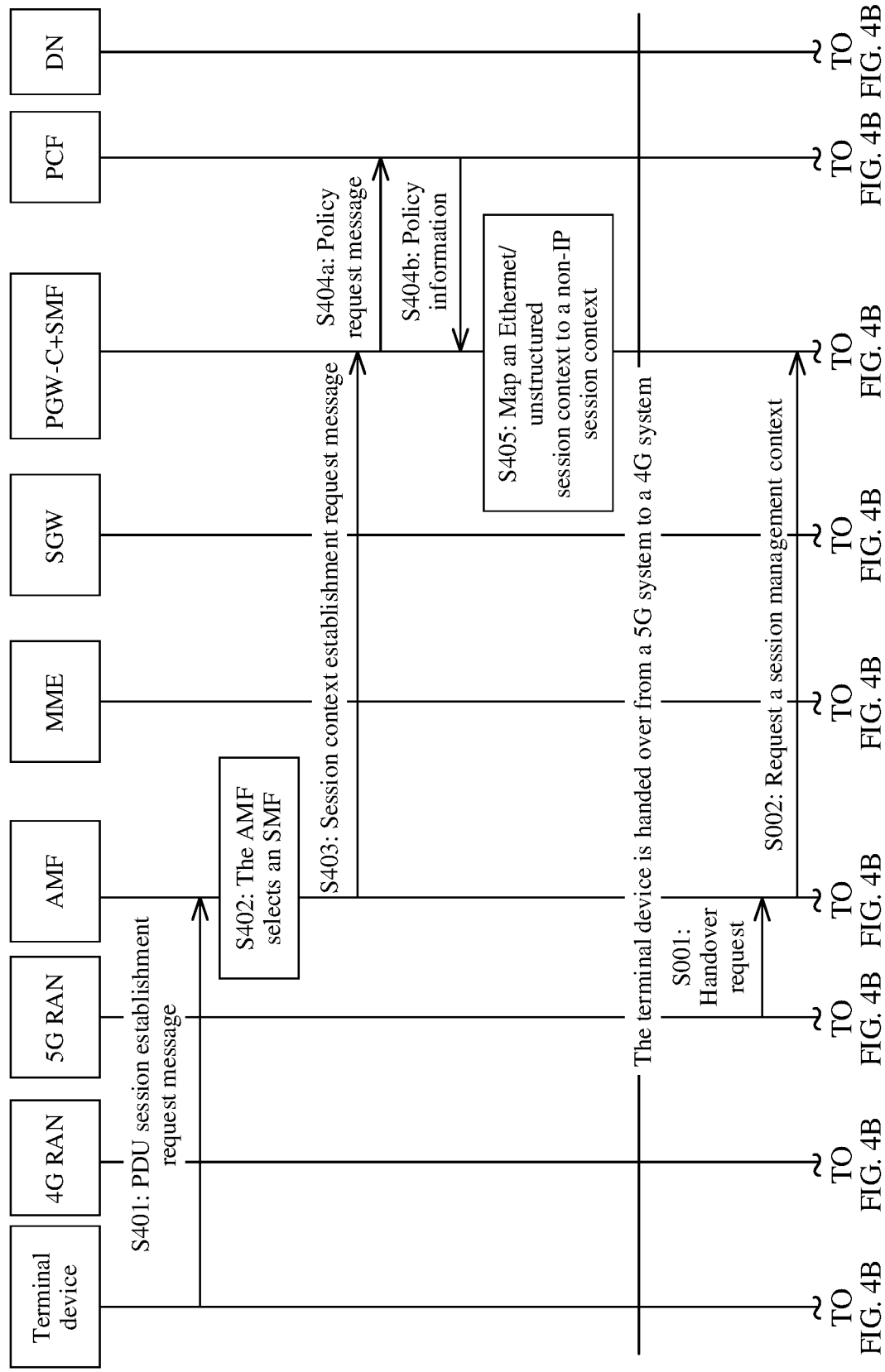
FIG. 4A is a signaling exchange diagram according to an embodiment.
Figure 4B:
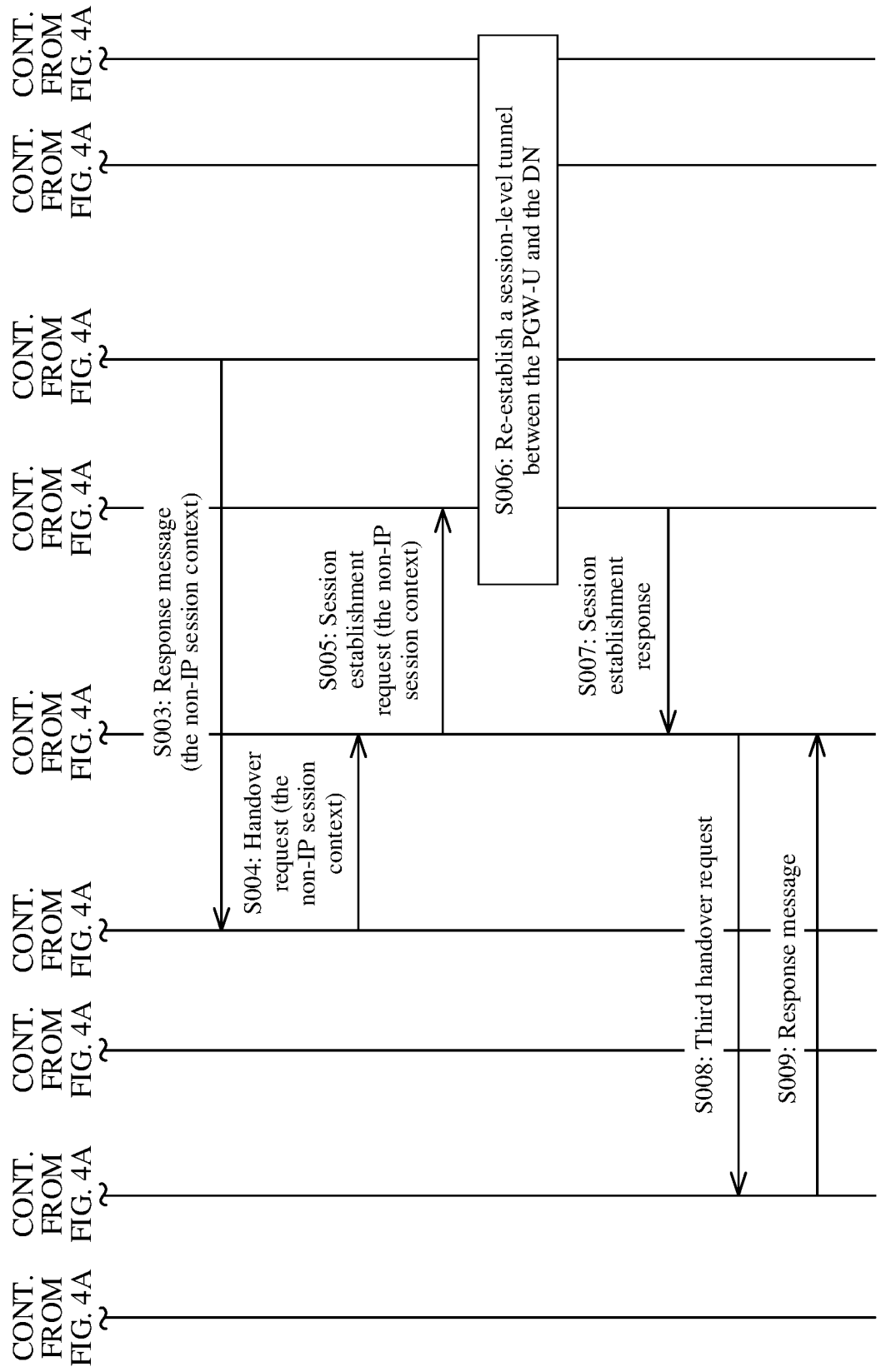
FIG. 4B is a signaling exchange diagram according to an embodiment.

FIG. 4A and FIG. 4B describe, in detail with reference to an embodiment, the method described in FIG. 2. FIG. 4A and FIG. 4B are a signaling exchange diagram according to an embodiment. An example in which a first network is 5G and a second network is 4G is used. It may be understood that a 5G network element in this embodiment may be replaced with a corresponding network element in the first network. For example, an AMF may be replaced with a mobility management network element in the first network, an SMF may be replaced with a mobility management network element in the first network, and so on. A corresponding message name may also be replaced by a corresponding message in the first network, and so on. In this embodiment, in a session establishment phase, an SMF obtains capability information of a DN from a PCF or based on a local configuration, and determines, based on the capability information of the DN, whether to convert a session context. The following provides a detailed description with reference to the accompanying drawings.

Step S401: A terminal device sends a PDU session establishment request message (PDU session establishment) to an AMF, where the PDU session establishment request message includes an identifier of the data network, namely, a DNN.

The PDU session establishment request message includes two parts: a message (1) sent by the terminal device to the AMF; and a message (2) sent by the terminal device to the SMF. The AMF transparently forwards, to the SMF, the message (2) sent by the terminal device to the SMF.

The identifier of the data network may be included in the message (1) sent by the terminal device to the mobility management network element, or included in the message (2) sent by the terminal device to the session management network element, or the identifier of the data network is included in both the two parts. The message (2) sent by the terminal device to the session management network element is a session establishment request.

For details, refer to step S201.

Optionally, the message sent by the terminal device to the SMF (namely, the session establishment request) includes a PDU type. In this embodiment, the PDU type may be Ethernet/Unstructured.

Step S402: The AMF selects an SMF.

Step S403: The AMF sends a session context establishment request message to the SMF, where the session context establishment request message includes the identifier of the DN and the message (2) sent by the terminal device to the SMF (namely, the session establishment request). Optionally, the message sent by the terminal device to the SMF (namely, the session establishment request) includes the PDU type. In this embodiment, the PDU type may be Ethernet/Unstructured.

Step S404a: The SMF sends a policy request message to a PCF, where the policy request message includes the DNN, and optionally, further includes the PDU type.

Step S404b: The PCF returns policy information to the SMF based on the PDU type, where the policy information includes a DN capability. The DN capability indicates a capability of the DN for supporting a non-IP session, and, for example, indicates that the DN supports the non-IP session or does not support the non-IP session.

Optionally, step S404a and step S404b may alternatively be replaced with step S404. The SMF may locally configure the DN capability, and the SMF locally obtains the DN capability. In this way, the SMF does not need to initiate a policy request to the PCF.

Step S405: The SMF determines, based on the DN capability, whether to map an Ethernet/unstructured session context to a non-IP session context.

If the DN supports the non-IP session, the SMF maps the Ethernet/unstructured session context to the non-IP session context.

Alternatively, if the DN does not support the non-IP session, the SMF does not map the Ethernet/unstructured session context to the non-IP session context.

Alternatively, there may be another case. Details are not described herein.

Optionally, when the terminal device is handed over from a 5G system to a 4G system, steps in a handover scenario are performed.

Step S001: A 5G RAN sends a handover request to the AMF.

Step S002: The AMF sends a request message to the SMF, to request a session management context.

Step S003: If the non-IP session context is generated in step S406, the SMF returns the non-IP context to the AMF in a response message.

Step S004: The AMF sends another handover request to an MME in the 4G system, where the handover request includes the non-IP context of the terminal device.

Step S005: The MME sends a session establishment request to an SGW in the 4G system, where the session establishment request includes the non-IP context of the terminal device.

Step S006: The SGW, a PGW-C, a PGW-U, and a DN server re-establish a session-level tunnel based on the non-IP context.

Step S007: The SGW returns a session establishment response to the MME.

Step S008: The MME sends a third handover request to a 4G RAN node.

Step S009: The 4G RAN node returns a response message to the MME.

After step S009, the terminal device receives the non-IP session context from the 4G RAN node, to establish an air interface bearer between the terminal device and the 4G RAN node. The non-IP session context is generated based on the Ethernet or unstructured session context of the terminal device.

Figure 5:
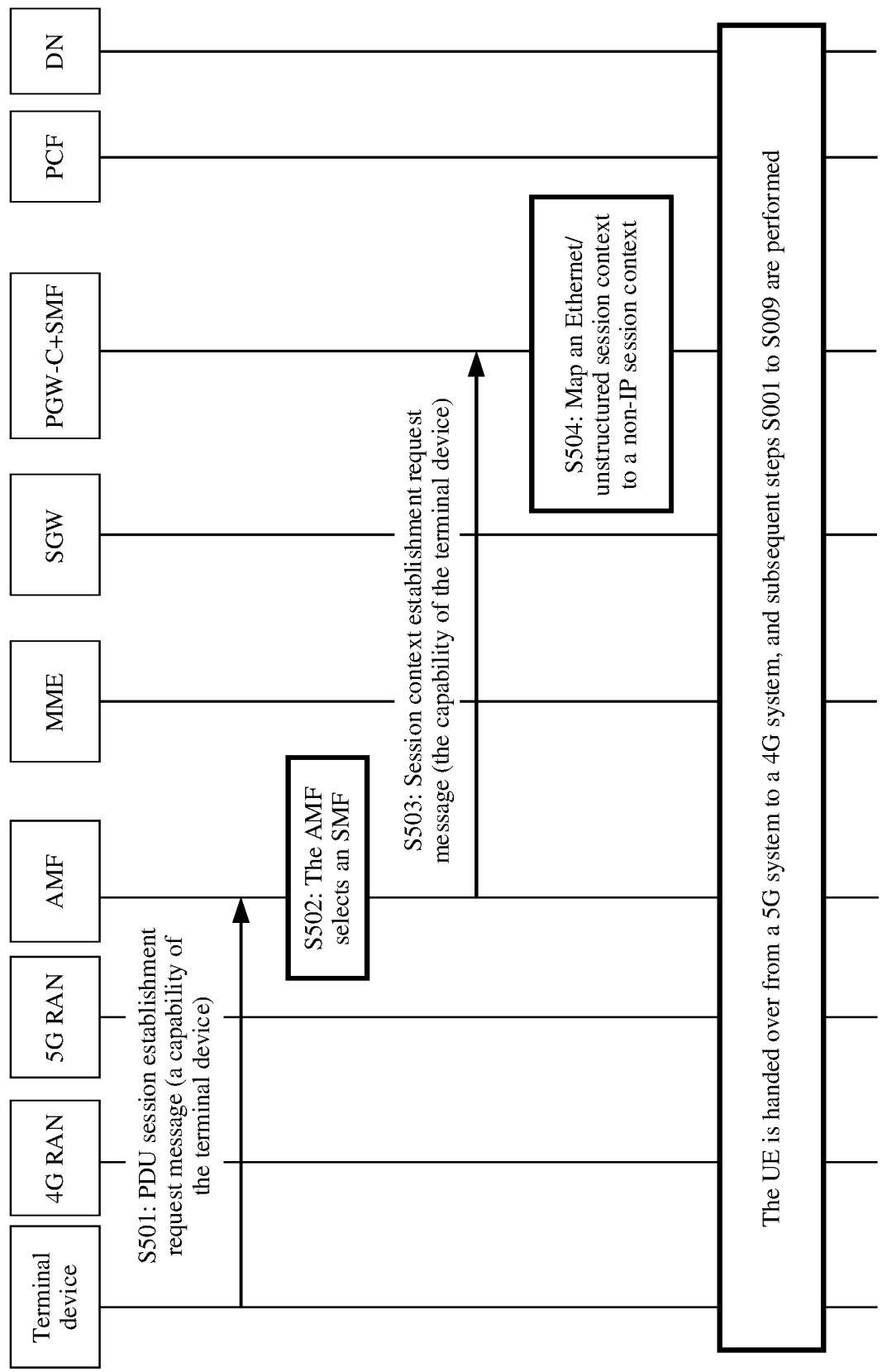
FIG. 5 is a signaling exchange diagram according to another embodiment.

FIG. 5 to FIG. 6B describe, in detail with reference to embodiments, the method described in FIG. 3. FIG. 4A and FIG. 4B are a handover signaling exchange diagram according to another embodiment. An example in which a first network is 5G and a second network is 4G is used. It may be understood that a 5G network element in this embodiment may be replaced with a corresponding network element in the first network, for example, an AMF may be replaced with a mobility management network element in the first network, an SMF may be replaced with a mobility management network element in the first network, and so on. A corresponding message name may also be replaced by a corresponding message in the first network, and so on. In this embodiment, in a session establishment phase, an SMF obtains capability information of a DN from a session establishment request message or from a UDM, and determines, based on the capability information of the DN, whether to convert a session context. The following provides a detailed description with reference to the accompanying drawings. The method includes the following steps.

Step S501: A terminal device sends a PDU session establishment request message to an AMF, where the PDU session establishment request message includes capability information of the terminal device.

The PDU session establishment request message includes two parts: a message (1) sent by the terminal device to the AMF; and a message (2) sent by the terminal device to the SMF. The AMF transparently forwards, to the SMF, the message (2) sent by the terminal device to the SMF.

The capability information of the terminal device may be included in the message (1) sent by the terminal device to the mobility management network element, or included in the message (2) sent by the terminal device to the session management network element, or an identifier of the data network is included in both the two parts. The message (2) sent by the terminal device to the session management network element is a session establishment request.

For details, refer to step S301.

Step S502: The AMF selects an SMF.

Step S503: The AMF sends a session context establishment request message to the SMF, where the message includes capability information of the terminal device and the message (2) sent by the terminal device to the SMF (namely, the session establishment request). In the embodiments, the capability information of the terminal device describes a capability of the terminal device for supporting a non-IP session. For example, the terminal device supports the non-IP session or the terminal device does not support the non-IP session. Alternatively, the session context establishment request message sent by the AMF to the SMF in step S503 includes an identifier of the terminal device, so that the SMF subsequently queries a subscription database based on the identifier of the terminal device, to obtain the capability information of the terminal device from subscription data of the terminal device.

Step S504: The SMF determines, based on the capability information of the terminal device, whether to map an Ethernet/unstructured session context to a non-IP session context. For example, if the terminal device supports the non-IP session, the SMF maps the Ethernet/unstructured session context to the non-IP session context. Alternatively, if the terminal device does not support the non-IP session, the SMF does not map the Ethernet/unstructured session context to the non-IP session context. Alternatively, there may be another case. Details are not described herein.

Optionally, when the terminal device is handed over from a 5G system to a 4G system, steps in a handover scenario are performed. Refer to step S001 to step S009 in the embodiment in FIG. 4A and FIG. 4B.

Figure 6A:
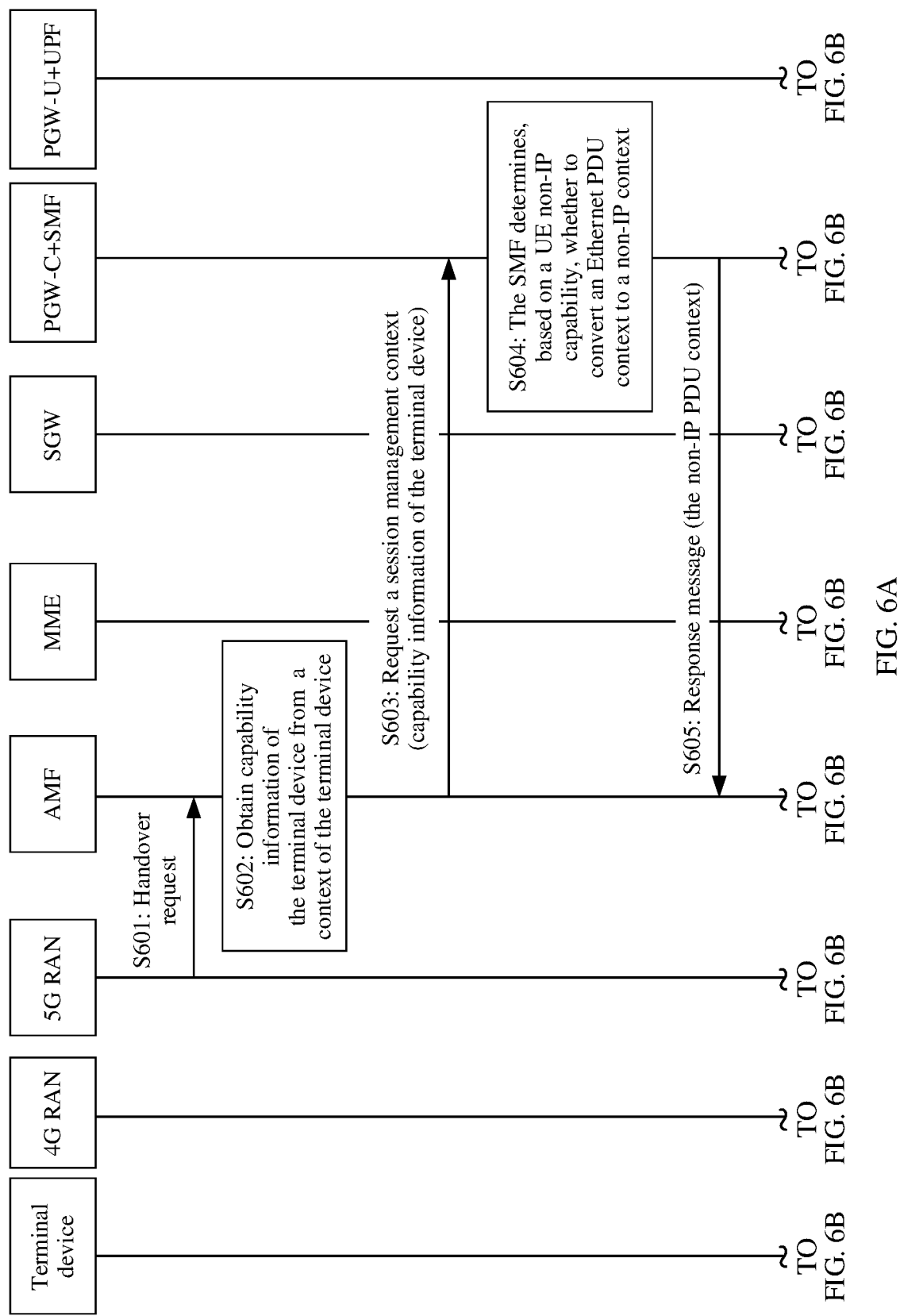
FIG. 6A is a signaling exchange diagram according to still another embodiment.

FIG. 6A and FIG. 6B are a handover signaling exchange diagram according to still another embodiment. An example in which a first network is 5G and a second network is 4G is used. It may be understood that a 5G network element in this embodiment may be replaced with a corresponding network element in the first network, for example, an AMF may be replaced with a mobility management network element in the first network, an SMF may be replaced with a mobility management network element in the first network, and so on. A corresponding message name may also be replaced by a corresponding message in the first network, and so on. In this embodiment, an AMF obtains capability information of a terminal device in a process in which the terminal device registers with a network. When handover occurs, an SMF obtains the capability information of the terminal device from a message that is sent by the AMF and that is used to request a session context, and determines, based on capability information of a DN, whether to convert a session context. The following provides a detailed description with reference to the accompanying drawings.

S601: A 5G RAN sends a handover request to the AMF.

S602: The AMF obtains capability information of the terminal device from a context of the terminal device, where the capability information of the terminal device indicates whether the terminal device can support a non-IP session. In an embodiment, the capability information of the terminal device may be added to a registration request message when the terminal device initiates the registration request. After receiving the registration request, the AMF stores the capability information of the terminal device in the context of the terminal device.

S603: The AMF sends a request message to the SMF, to request a session management context, where the request message includes the capability information of the terminal device (for example, whether the terminal device can support the non-IP session).

S604: The SMF determines, based on whether the terminal device supports the non-IP session, whether to map an Ethernet/unstructured PDU session context to a non-IP context.

S605: If the terminal device supports the non-IP session, the SMF maps the Ethernet/unstructured PDU session context to the non-IP context, and returns the non-IP context to the AMF in a response message. Alternatively, if the terminal device does not support the non-IP session, the SMF does not map the Ethernet/unstructured session context to the non-IP session context. Alternatively, there may be another case. Details are not described herein.

S606: The AMF sends another handover request to an MME in the 4G system, where the handover request includes the non-IP context of the terminal device.

S607: The MME sends a session establishment request to an SGW in the 4G system, where the session establishment request includes the non-IP context of the terminal device.

S608: The SGW, a PGW-C, a PGW-U, and a DN server re-establish a session-level tunnel based on the non-IP context.

S609: The SGW returns a session establishment response to the MME

S610: The MME sends a third handover request to a 4G RAN node.

S611: The 4G RAN node returns a response message to the MME.

After step S611, the terminal device receives the non-IP session context from the 4G RAN node, to establish an air interface bearer between the terminal device and the 4G RAN node. The non-IP session context is generated based on the Ethernet or unstructured session context of the terminal device.

In the embodiments, the session management network element, the mobility management network element, and the terminal device may be divided into function modules based on the foregoing method examples in FIG. 2 to FIG. 6B. For example, each function module may be obtained through division based on each corresponding function, or two or more functions may be integrated into one processing module. The integrated module may be implemented in a form of hardware, or may be implemented in a form of a software functional module. It can be noted that, in this embodiment, division into the modules is an example, is merely a logical function division, and may be other division in an actual implementation.

Figure 7:
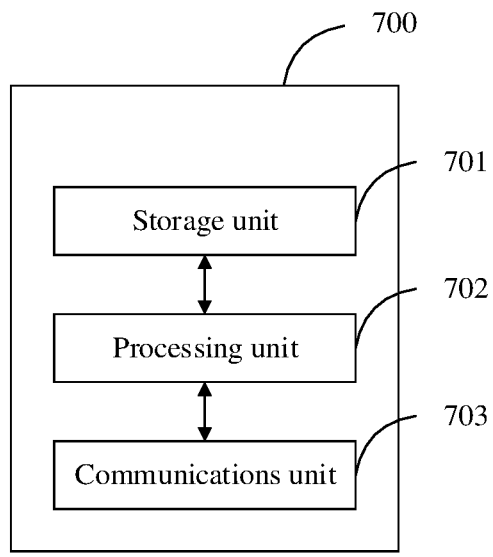
FIG. 7 is a possible schematic structural diagram of a session management network element according to an embodiment.

When each function module is obtained through division based on each corresponding function, FIG. 7 is a possible schematic structural diagram of a session management network element 700 according to an embodiment. The session management network element 700 is configured to implement functions of the session management network element in the method embodiments in FIG. 2 to FIG. 6B. The session management network element 700 may include a communications unit 701 and a processing unit 702. The communications unit 701 is configured to support information sending and receiving between the session management network element and another network element in the foregoing embodiments. The communications unit may include an independent receiving unit and an independent sending unit, or may be an integrated unit. The processing unit 702 performs various processing functions. For example, the communications unit 701 is configured to support the session management network element 700 in implementing information sending and receiving functions in related steps such as steps S202, S206, S207, S302, S306, S307, S403, S404*a*, S404*b*, S002, S003, S503, S603, and S605 in FIG. 2 to FIG. 6A. The processing unit 702 is configured to support the session management network element 700 in implementing a processing function and the like in related steps such as steps S203, S204, S303, S304, S405, S504, and 604 in FIG. 2 to FIG. 6A. Optionally, the session management network element 700 may further include a storage unit 703. The storage unit 703 is configured to store program code and data of the session management network element 700.

For example, when the session management network element 700 is configured to perform the embodiments in FIG. 2 and FIG. 4A and FIG. 4B, the communications unit 701 is configured to receive a first message that is from a mobility management network element and that is used to request to establish a session for a terminal device, where the first message carries an identifier of a data network; and the processing unit 702 is configured to: obtain capability information of the data network based on the identifier of the data network; and when the capability information of the data network is that the data network supports a non-IP session, generate a non-IP session context based on an Ethernet or unstructured session context of the terminal device.

Optionally, the communications unit 701 is further configured to: receive a second message that is from the mobility management network element and that is used to request a session context of the terminal device; and send the non-IP session context to the mobility management network element.

Optionally, the processing unit 702 is configured to obtain, based on the identifier of the data network, the capability information of the data network from information stored in the session management network element 700; or the processing unit 702 is configured to: send the identifier of the data network to a policy management network element by using the communications unit 701, and receive the capability information of the data network from the policy control function.

Optionally, when the first message further includes a session type, and the session type indicates that the session is of an Ethernet type or an unstructured type, the processing unit 702 is configured to obtain capability information of the data network based on the identifier of the data network and the session type. For example, the processing unit 702 obtains, based on the identifier of the data network and the session type, the capability information of the data network from the information stored in the session management network element 700; or the processing unit 702 sends the identifier of the data network and the session type to the policy control function by using the communications unit 701, and receives the capability information of the data network from the policy control function.

According to the session management network element 700 provided in this embodiment, the session management network element 700 learns of the capability information of the DN, and determines, based on whether the DN supports the non-IP session, whether to perform the action of generating the non-IP session context based on the Ethernet or unstructured session context, rather than performing, in any case, the action of generating the non-IP session context based on the Ethernet or unstructured session context. Therefore, network resources are saved.

For example, when the session management network element 700 is configured to perform the embodiments in FIG. 3, FIG. 5, and FIG. 6A and FIG. 6B, the processing unit 702 is configured to obtain capability information of a terminal device by using the communications unit 701; and the processing unit 702 is further configured to: when the capability information of the terminal device is that the terminal device supports a non-IP session, generate a non-IP session context based on an Ethernet or unstructured session context.

Optionally, the communications unit 701 is configured to: receive a second message that is from a mobility management network element and that is used to request a session context of the terminal device; and send the non-IP session context to the mobility management network element.

Optionally, when the second message carries the capability information of the terminal device, the processing unit 702 obtains the capability information of the terminal device from the second message.

Optionally, the obtaining capability information of a terminal device includes: the communications unit 701 is configured to receive a first message that is from the mobility management network element and that is used to request to establish a session for the terminal device, where the first message carries the capability information of the terminal device; and the processing unit 702 is configured to obtain the capability information of the terminal device from the first message, or the processing unit 702 is configured to obtain subscription information of the terminal device from a subscription database by using the communications unit 701, where the subscription information includes the capability information of the terminal device.

According to the session management network element 700 provided in this embodiment, the session management network element 700 learns of the capability information of the terminal device, and determines, based on whether the terminal device supports the non-IP session, whether to perform the action of generating the non-IP session context based on the Ethernet or unstructured session context, rather than performing, in any case, the action of generating the non-IP session context based on the Ethernet or unstructured session context. Therefore, network resources are saved.

In another embodiment, because the embodiments in FIG. 2 and FIG. 3 may be combined, the session management network element 700 provided in this embodiment may obtain the capability information of the DN and the capability information of the terminal device, and determine, based on the capability information of the DN and the capability information of the terminal device, whether to perform the action of generating the non-IP session context based on the Ethernet or unstructured session context. When the capability information of the DN is that the DN supports the non-IP session, and the capability information of the terminal device is that the terminal device supports the non-IP session, the session management network element 700 provided in this embodiment generates the non-IP session context based on the Ethernet or unstructured session context. Optionally, when handover occurs, the session management network element 700 may further send the non-IP session context to the mobility management network element.

Figure 8:
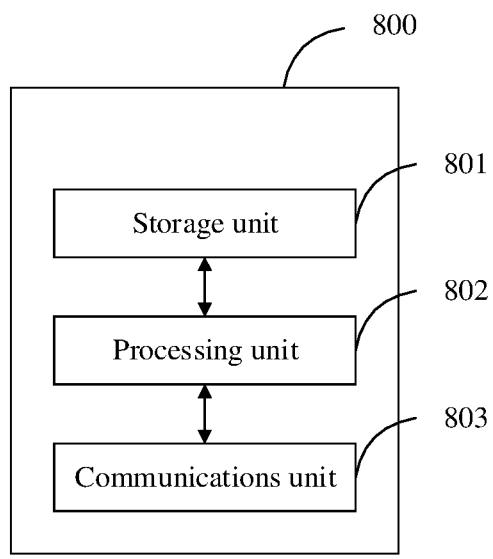
FIG. 8 is a possible schematic structural diagram of a mobility management network element according to an embodiment.

When each function module is obtained through division based on each corresponding function, FIG. 8 is a possible schematic structural diagram of a mobility management network element 800 according to an embodiment. The mobility management network element 800 is configured to implement functions of the mobility management network element in the method embodiments in FIG. 2 to FIG. 6B. The mobility management network element may include a communications unit 801 and a processing unit 802. The communications unit 801 is configured to support information sending and receiving between the mobility management network element and another network element in the foregoing embodiments. The communications unit 801 may include an independent receiving unit and an independent sending unit, or may be an integrated unit. The processing unit 802 performs various processing functions. For example, the communications unit 801 is configured to support the mobility management network element in implementing information sending and receiving functions in related steps such as steps 201, 202, 205, 206, 207, 301, 302, 305, 306, 307, 401, 403, 001, 002, 003, 004, 501, 503, 601, and 603 in FIG. 2 to FIG. 6A. The processing unit 802 is configured to support the mobility management network element in implementing a processing function in related steps such as steps 202, 302, 402, 502, and 602 in FIG. 2 to FIG. 6A. Optionally, the mobility management network element may further include a storage unit 803. The storage unit 803 is configured to store program code and data of the mobility management network element 800.

For example, the processing unit 802 is configured to obtain capability information of a terminal device, and the communications unit 801 is configured to: receive a message that is from an access network device and that is used to request handover; send a second message to a session management network element, to request a session context of the terminal device, where the second message carries the capability information of the terminal device; and receive a non-IP session context that is returned by the session management network element based on the capability information of the terminal device.

Optionally, the communications unit 801 is configured to receive a registration request from the terminal device, where the registration request carries the capability information of the terminal device; and the processing unit 802 is configured to obtain the capability information of the terminal device from the registration request; or the processing unit 802 is configured to obtain subscription information of the terminal device from a subscription database by using the communications unit 801, where the subscription information carries the capability information of the terminal device.

Figure 9:
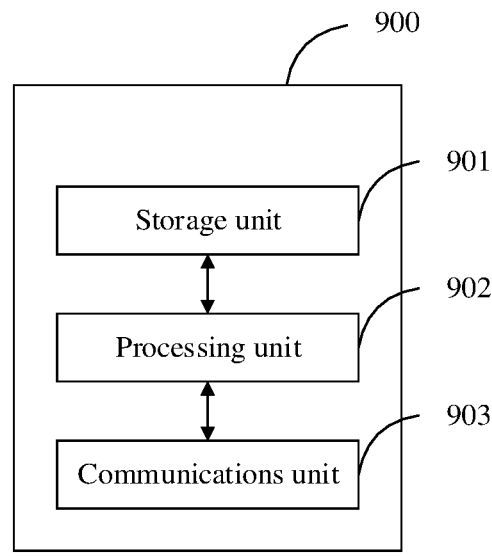
FIG. 9 is a possible schematic structural diagram of a terminal device according to an embodiment.

When each function module is obtained through division based on each corresponding function, FIG. 9 is a possible schematic structural diagram of a terminal device 900 according to an embodiment. The terminal device 900 is configured to implement functions of the terminal device in the method embodiments in FIG. 2 to FIG. 6B. The terminal device 900 may include a communications unit 901 and a processing unit 902. The communications unit 901 is configured to support information sending and receiving between the terminal device 900 and another network element in the foregoing embodiments. The communications unit 901 may include an independent receiving unit and an independent sending unit, or may be an integrated unit. The processing unit 902 performs various processing functions. For example, the communications unit 901 is configured to support the terminal device 900 in implementing information sending and receiving functions in related steps such as steps S201, S301, S401, and S501 in FIG. 2 to FIG. 6B. The processing unit 902 is configured to support the terminal device 900 in implementing a processing function and the like in related steps such as steps S301, S501, and S602 in FIG. 2 to FIG. 6A. Optionally, the terminal device 900 may further include a storage unit 903, and the storage unit 903 is configured to store program code and data of the terminal device 900.

For example, the processing unit 902 is configured to obtain capability information of the terminal device from information stored in the terminal device; and the communications unit 901 is configured to send a message to a mobility management network element, to request to register with a network or request to establish a session, where the message carries the capability information of the terminal device.

Optionally, when the capability information of the terminal device is that the terminal device 900 supports a non-IP session, the communications unit 901 is further configured to receive a non-IP session context from a network side, where the non-IP session context is generated based on an Ethernet or unstructured session context of the terminal device 900.

It may be understood that the processing units 702, 802, and 902 in FIG. 7, FIG. 8, and FIG. 9 each may be a processor or a controller, for example, may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content in the embodiments. Alternatively, the processor may be a combination of processors implementing a computing function, for example, a combination of one or more microprocessors, or a combination of a DSP and a microprocessor. The communications units 701, 801, and 901 each may be a transceiver interface. The storage units 703, 803, and 903 each may be a memory.

Figure 10:
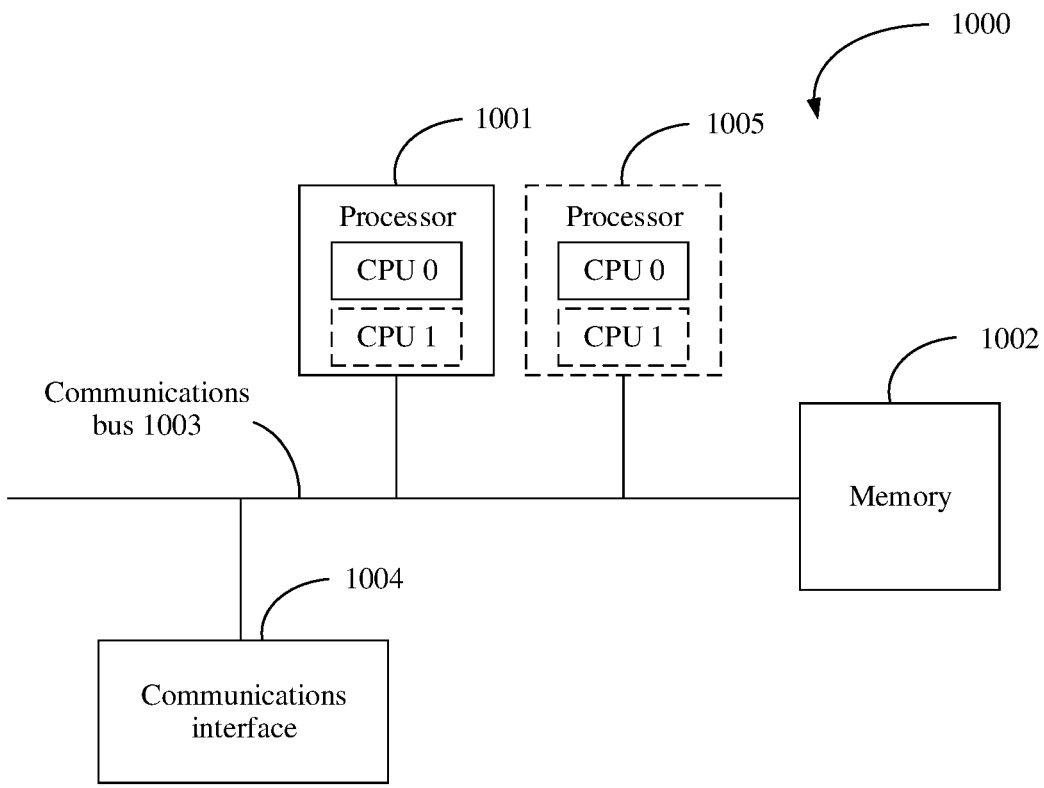
FIG. 10 is a possible schematic structural diagram of a communications device according to an embodiment.

When the processing unit is a processor, the communications unit is a transceiver, and the storage unit is a memory, the session management network element, the mobility management network element, and the terminal device in the embodiments may be a communications apparatus shown in FIG. 10. FIG. 10 is a schematic diagram of a communications apparatus 1000. The communications apparatus 1000 includes at least one processor 1001 and a memory 1002, and may further include a communications bus 1003 and at least one communications interface 1004. The apparatus 1000 may be any device in the embodiments, and the apparatus 1000 may be configured to perform the method provided in the embodiments.

The processor 1001 may be a general-purpose CPU, a microprocessor, an ASIC, or one or more integrated circuits for controlling program execution of the solutions in the embodiments.

The memory 1002 may be a read-only memory (ROM), another type of static storage device that can store static information and an instruction, a random access memory (RAM), or another type of dynamic storage device that can store information and an instruction; or may be an electrically erasable programmable read-only memory (EEPROM), a compact disc read-only memory (CD-ROM) or another optical disk storage, an optical disc storage (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, this is not limited herein. The memory may exist independently, and is connected to the processor by using a bus. The memory may alternatively be integrated with the processor.

The communications bus 1003 may include a path for transmitting information between the foregoing components.

The communications interface 1004 may be any apparatus such as a transceiver, and is configured to communicate with another device or a communications network such as the Ethernet, a radio access network (RAN), or a WLAN.

The memory 1003 is configured to store program code, and the processor 1001 is configured to execute the program code stored in the memory 1002.

For example, the processor 1001 may include one or more CPUs, for example, a CPU 0 and a CPU 1 in FIG. 10.

For example, the apparatus 1000 may include a plurality of processors, for example, the processor 1001 and a processor 1005 in FIG. 10. Each of the processors may be a single-core (single-CPU) processor, or may be a multi-core (multi-CPU) processor. The processor herein may be one or more devices, circuits, and/or processing cores for processing data (for example, a computer program instruction).

For example, the apparatus shown in FIG. 10 may be a component of a session management network element, and the memory of the apparatus shown in FIG. 10 stores one or more software modules. The apparatus shown in FIG. 10 may execute the program code in the memory by using the processor, to implement the steps performed by the session management network element in the embodiments.

For example, the apparatus shown in FIG. 10 may be a component of a mobility management network element, and the memory of the apparatus shown in FIG. 10 stores one or more software modules. The apparatus shown in FIG. 10 may execute the program code in the memory by using the processor, to implement the steps performed by the mobility management network element in the embodiments.

For example, the apparatus shown in FIG. 10 may be a terminal device or a component of a terminal device, and the memory of the apparatus shown in FIG. 10 stores one or more software modules. The apparatus shown in FIG. 10 may execute the program code in the memory by using the processor, to implement the steps performed by the terminal device in the embodiments.

An embodiment further provides a computer storage medium that stores program code. When being executed by a processor, the program code may be used to perform the steps of the session management network element in the foregoing method embodiments.

An embodiment further provides a computer storage medium that stores program code. When being executed by a processor, the program code may be used to perform the steps of the mobility management network element in the foregoing method embodiments.

An embodiment further provides a computer storage medium that stores program code. When being executed by a processor, the program code may be used to perform the steps of the terminal device in the foregoing method embodiments.

An embodiment further provides a computer program product. The computer program product includes a computer software instruction, and the computer software instruction may be executed by a processor to implement a method of the session management network element in the foregoing method embodiments.

An embodiment further provides a computer program product. The computer program product includes a computer software instruction, and the computer software instruction may be executed by a processor to implement a method of the mobility management network element in the foregoing method embodiments.

An embodiment further provides a computer program product. The computer program product includes a computer software instruction, and the computer software instruction may be executed by a processor to implement a method of the terminal device in the foregoing method embodiments.

An embodiment further provides a communications system, including the foregoing session management network element and/or mobility management network element. Optionally, the system may further include a terminal device.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Although implementations are described with reference to the embodiments, a person of ordinary skill in the art may understand and implement another variation of the embodiments by viewing the accompanying drawings and content A single processor or another unit may implement several functions enumerated in the embodiments.

A person of ordinary skill in the art can understand that the embodiments may be provided as a method, an apparatus (device), a computer-readable storage medium, or a computer program product. Therefore, implementations may use a form of hardware only embodiments, software only embodiments, or embodiments with a combination of software and hardware. They are collectively referred to as "modules" or "systems".

A person of ordinary skill in the art may further understand that various illustrative logical blocks (illustrative logic block) and steps (step) that are listed in the embodiments may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments.

Although the implementations are described with reference to features and the embodiments thereof, various modifications and combinations may be made to them without departing from the spirit and scope of the embodiments. Correspondingly, the specification and accompanying drawings are merely exemplary descriptions of the embodiments, and are considered as any of or all modifications, variations, combinations or equivalents that cover the scope of the embodiments. A person of ordinary skill in the art can make various modifications and variations to the embodiments without departing from the spirit and scope of the embodiments.

What is claimed is:

1. A session context handling method, comprising:
   receiving, by a session management network element, a first message that is from a mobility management network element and that is used to request to establish a session for a terminal device, wherein the first message carries an identifier of a data network;
   obtaining, by the session management network element, capability information of the data network based on the identifier of the data network; and
   in response to the capability information of the data network is that the data network supports a non-IP session, generating, by the session management network element, a non-IP session context based on an Ethernet or unstructured session context of the terminal device.

2. The method according to claim 1, further comprising:
   receiving, by the session management network element, a second message that is from the mobility management network element and that is used to request a session context of the terminal device; and
   sending, by the session management network element, the non-IP session context to the mobility management network element.

3. The method according to claim 1, wherein the obtaining, by the session management network element, of the capability information of the data network based on the identifier of the data network comprises:
   obtaining, by the session management network element based on the identifier of the data network, the capability information of the data network from information stored in the session management network element; or
   sending, by the session management network element, the identifier of the data network to a policy control function, and receiving the capability information of the data network from the policy control function.

4. The method according to claim 1, wherein the first message further comprises a session type.

5. The method according to claim 4, wherein the session type indicates that the session is of an Ethernet type or an unstructured type, and the obtaining, by the session management network element, of the capability information of the data network based on the identifier of the data network comprises:
   obtaining, by the session management network element, the capability information of the data network based on the identifier of the data network and the session type.

6. The method according to claim 5, wherein the obtaining, by the session management network element, of the capability information of the data network based on the identifier of the data network and the session type comprises:
   obtaining, by the session management network element based on the identifier of the data network and the session type, the capability information of the data network from the information stored in the session management network element; or
   sending, by the session management network element, the identifier of the data network and the session type to a policy control function, and receiving the capability information of the data network from the policy control function.

7. The method according to claim 5, further comprising:
   sending, by the mobility management network element, the first message to the session management network element.

8. A communications apparatus, comprising
   a memory storing program code; and
   a processor in communication with the memory, the processor executing the program code to perform:
   receiving a first message that is from a mobility management network element and that is used to request to establish a session for a terminal device, and the first message carries an identifier of a data network;
   obtaining capability information of the data network based on the identifier of the data network; and
   in response to the capability information of the data network is that the data network supports a non-IP session, generating a non-IP session context based on an Ethernet or unstructured session context of the terminal device.

9. The communications apparatus according to claim 8, wherein the processor is further configured to:
  receive a second message that is from the mobility management network element and that is used to request a session context of the terminal device; and
  send the non-IP session context to the mobility management network element.

10. The communications apparatus according to claim 8, wherein the processor is further configured to:
  obtain, based on the identifier of the data network, the capability information of the data network from information stored in the communications apparatus; or
  send the identifier of the data network to a policy control function by using the communications unit, and receive the capability information of the data network from the policy control function.

11. The communications apparatus according to claim 8, wherein the first message further comprises a session type.

12. The communications apparatus according to claim 11, wherein the session type indicates that the session is of an Ethernet type or an unstructured type, and the processor is further configured to obtain the capability information of the data network based on the identifier of the data network and the session type.

13. A communications system, comprising:
  a session management network element, and
  a mobility management network element; wherein
  the mobility management network element is configured to send a first message to the session management network element, the first message is used to request to establish a session for a terminal device, and the first message carries an identifier of a data network; and
  the session management network element is configured to receive the first message, obtain capability information of the data network based on the identifier of the data network, and, in response to the capability information of the data network is that the data network supports a non-IP session, generate a non-IP session context based on an Ethernet or unstructured session context of the terminal device.

14. The system according to claim 13, wherein the mobility management network element is further configured to send a second message requesting a session context of the terminal device to the session management network element; and
  the session management network element is further configured to receive the second message, and send the non-IP session context to the mobility management network element.

15. The system according to claim 13, wherein the session management network element is further configured to:
  obtain the capability information of the data network from information stored in the session management network element based on the identifier of the data network.

16. The system according to claim 13, wherein the session management network element is further configured to:
  send the identifier of the data network to a policy control function; and
  receive the capability information of the data network from the policy control function.

17. The system according to claim 13, wherein the first message further comprises a session type.

18. The system according to claim 17, wherein the session type indicates that the session is of an Ethernet type or an unstructured type, and the session management network element is further configured to:
  obtain the capability information of the data network based on the identifier of the data network and the session type.

19. The system according to claim 18, wherein the session management network element is further configured to:
  obtain the capability information of the data network from the information stored in the session management network element based on the identifier of the data network and the session type.

20. The system according to claim 18, wherein the session management network element is further configured to:
  send the identifier of the data network and the session type to a policy control function; and
  receive the capability information of the data network from the policy control function.

* * * * *